(12) United States Patent
Wolken

(10) Patent No.: US 7,055,325 B2
(45) Date of Patent: Jun. 6, 2006

(54) PROCESS AND APPARATUS FOR GENERATING POWER, PRODUCING FERTILIZER, AND SEQUESTERING, CARBON DIOXIDE USING RENEWABLE BIOMASS

(76) Inventor: Myron B. Wolken, 709 N. Central, Beloit, KS (US) 67420

( * ) Notice: Subject to any disclaimer, the term of this patent is extended or adjusted under 35 U.S.C. 154(b) by 451 days.

(21) Appl. No.: 10/338,209

(22) Filed: Jan. 7, 2003

(65) Prior Publication Data

US 2003/0126899 A1  Jul. 10, 2003

Related U.S. Application Data

(60) Provisional application No. 60/346,724, filed on Jan. 7, 2002.

(51) Int. Cl.
*F01K 17/00* (2006.01)
(52) U.S. Cl. ............................. 60/648; 60/670
(58) Field of Classification Search .................. 60/645, 60/648, 670
See application file for complete search history.

(56) References Cited

U.S. PATENT DOCUMENTS

| | | | |
|---|---|---|---|
| 3,956,126 A * | 5/1976 | Streebin et al. ............. 210/104 |
| 3,965,362 A * | 6/1976 | Harvey ....................... 290/1 R |
| 5,146,755 A | 9/1992 | Abdelmalek .................. 60/655 |
| 5,321,946 A | 6/1994 | Abdelmalek .................. 60/648 |
| 5,607,011 A | 3/1997 | Abdelmalek ........... 165/104.14 |
| 5,975,020 A | 11/1999 | Caveny et al. ............. 119/174 |
| 6,264,909 B1 | 7/2001 | Drinkard, Jr. ............ 423/390.1 |
| 6,447,437 B1 * | 9/2002 | Lee et al. .................... 588/250 |
| 6,570,049 B1 * | 5/2003 | Taylor ........................ 588/317 |
| 6,694,900 B1 * | 2/2004 | Lissianski et al. .......... 110/345 |

* cited by examiner

*Primary Examiner*—Hoang Nguyen
(74) *Attorney, Agent, or Firm*—Jeffrey L. Thompson; Thompson & Thompson, P.A.

(57) ABSTRACT

A process and apparatus are described for generating electrical energy using grains or other renewable biomass as the fuel, and for producing fertilizer to grow subsequent crops. In the process, a biomass material is incinerated in a firebox of a boiler to power a first turbine to create electricity. An excess air flow is introduced into the firebox to increase $NO_x$ production. The oxidation area of the boiler is operated at a temperature exceeding about 2,000° F., and the flue gases are maintained in the high temperature environment for an increased residence time to increase $NO_x$ production. The flyash from the incinerated biomass is filtered from the flue gases exhausted from the boiler. The $NO_x$ is removed from the filtered flue gases and used to produce a nitrogen fertilizer. The nitrogen fertilizer is blended with the flyash to form a balanced fertilizer product which allows sustainable production of the biomass material.

20 Claims, 3 Drawing Sheets

PROCESS AND APPARATUS FOR GENERATING POWER, PRODUCING FERTILIZER, AND SEQUESTERING, CARBON DIOXIDE USING RENEWABLE BIOMASS

RELATED APPLICATIONS

The Applicant claims priority under 35 U.S.C. § 119(e) of provisional U.S. patent application Ser. No. 60/346,724 filed on Jan. 7, 2002.

BACKGROUND OF THE INVENTION

1. Field of the Invention

The present invention relates generally to processes and systems that use renewable biomass for generating power in the form of electricity and heat, for producing nitric acid-based fertilizer as a valuable by-product, and for accomplishing atmospheric remediation by sequestering carbon dioxide.

2. Description of the Related Art

The most prevalent form of electrical energy generation at this time in the United States is from fossil fuel systems. These include mainly coal and natural gas fired systems, as well as nuclear systems which account for about 15% of the market. While some progress is being made in making these systems more environmentally safe, they nonetheless produce large quantities of pollutants and toxic chemicals.

$SO_2$ and $NO_x$ are in the form of gases that turn to liquids once they are vented and are the primary source of acid rain. The mechanisms to reduce these offensive and dangerous byproducts are expensive to build and take large amounts of energy from the plant to operate. The energy consumed in reducing these byproducts reduces the net electrical output of the generation plant, and thereby lowers the efficiency of a conventional plant into a range of 34 to 42%.

Conventional energy plants also generate high volumes (25 to 30% of fuel volume) of undesirable waste in the form of cinders and flyash which contains, among other things, arsenic, lead, cadmium, zinc, and mercury. As these materials exit the firebox, they carry along large amounts of heat, further reducing the efficiency of the plant. The fossil fuel systems are nonrenewable and consume fuels for which there are limited supplies.

While nuclear power generation produces minimal $CO_2$ (primarily from electrical activity), decommissioning of nuclear power plants is expensive and inevitably leaves a contaminated site behind.

A well-known fact in the agricultural community is that grains are overproduced causing low commodity prices. The problem is too much grain and not enough uses and/or exports. Input costs continue to rise also causing losses to producers that have had to be subsidized by the government to stay viable. Fertilizer costs are the third highest input cost after land and machinery in grain production.

The most common fertilizers used today are nitric acid-based fertilizers. These fertilizers are typically produced by processes that use the gas phase oxidation of nitric oxide (NO) to nitric dioxide ($NO_2$) and partially back to nitric oxide. However, such processes are considered relatively inefficient, expensive, and limited in their industrial applicability.

An improved process for recovering nitric acid ($HNO_3$) from the $NO_x$ in a flue gas stream is described in U.S. Pat. No. 6,294,909 of Drinkard, Jr. This improved process involves reacting nitric acid with $NO_x$ to form $N_2O_3$ and water. The $N_2O_3$ reacts with water and is further oxidized to form additional nitric acid. Drinkard, Jr. has applied this technology to recover nitrogen gases from electric arc furnace dust in the steel industry. Drinkard, Jr. does not disclose the use of his $NO_x$ removal process in conjunction with a sustainable agricultural system that burns biomass to generate power, produce fertilizer, and sequester carbon.

SUMMARY OF THE INVENTION

It is an object of the present invention to provide a closed-loop facility fueled with biomass to produce heat, power, and nitrogen-based fertilizer with improved economic and environmental impacts.

It is a further object of the present invention to provide a process for generating power using renewable biomass that reduces emissions as compared to fossil fuel-fired power generation, and that sequesters carbon and saves soil nutrients, thereby improving the environment.

It is a further object of the present invention to provide a process for producing nitrogen-based fertilizers as a byproduct of power generation, and that reduces harmful emissions and reliance on fossil fuels.

The basic concept of the present invention is described as follows. A biomass material is incinerated in a firebox of a boiler to generate steam and power a first turbine to create electricity. An excess air flow is introduced into the firebox to increase $NO_x$ production. The oxidation area of the boiler is operated at a temperature exceeding about 2,000° F., and the flue gases are maintained in the high temperature environment for an increased residence time to increase $NO_x$ production. The flyash from the incinerated biomass is filtered from the flue gases exhausted from the boiler. The $NO_x$ is removed from the filtered flue gases and used to produce a nitrogen fertilizer. The nitrogen fertilizer is blended with the flyash to form a balanced fertilizer product which allows sustainable production of the biomass material as a fuel source.

The present invention provides a system for generating electric energy from grains and other biomass, instead of fossil fuels. The system improves the efficiency over conventional fossil fuel systems by more fully utilizing all the heat produced by the burning grain and reclaiming valuable by-products. The by-products include minerals in the flyash and nitrogen from the $NO_x$, both of which are reclaimed and used as fertilizer to regrow the grain. This allows for a continuous cogeneration system that has been mostly limited to spacial heating at this time and limited to upwards of 70% efficiency due to low burning temperatures. A variety of biomass products can be used in this system besides grain. For example, grain dust, switch grass, spent coffee grounds, moldy or musty grain, an array of blended products, intentionally or accidentally mixed grains, and adulterated or contaminated grains can be used.

With the present invention, it is not necessary to have exhaust gases exit a chimney at 400° F. or more to disperse undesirable and potentially toxic exhaust fumes over a broad area. Therefore, the invention can use heat exchangers to extract the last few hundred degrees from the flue gases as described, for example, in U.S. Pat. No. 5,146,755, and additionally in U.S. Pat. Nos. 4,711,093, 3,978,663, and 2,955,917. As a result, the efficiency of the energy production can be increased by up to 20 percent without detrimental effects on the atmosphere.

The present invention captures nitrogen that has been burned out of the atmosphere and fuel with the same energy that is producing the steam for electrical generation. Thus, the operating cost of fuel to produce the fertilizer is practically zero. This savings in the cost of fertilizer production will reduce input costs for the next grain crop to be produced.

Numerous other objects of the present invention will be apparent to those skilled in this art from the following description wherein there is shown and described a preferred embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DESCRIPTION OF THE PREFERRED EMBODIMENT

A process and system for generating power, producing fertilizer and sequestering carbon dioxide using renewable biomass will be described in detail with reference to FIG. 1 of the drawings. The potential impact upon agriculture, energy consumption, and the environment in the United States will then be explained with reference to FIGS. 2 and 3 of the drawings.

First, it should be noted that grains and grain by-products and virtually all organic materials suited to burn as a fuel for a commercial boiler can be used in the present invention. For example, conventional grains, including corn, milo, wheat, soybeans, and so forth, can be used, as well as other agricultural crops, such as switchgrass and the like. These biomass products are all combustible, although they have different fat and caloric content and slightly different mineral contents. For convenience of illustration and understanding, the present invention will be explained in connection with the production and consumption of corn, as well as its potential impact on the U.S. corn industry. Those skilled in the art will be able to apply the teachings herein to other suitable crops and biomass products.

Figure 1:
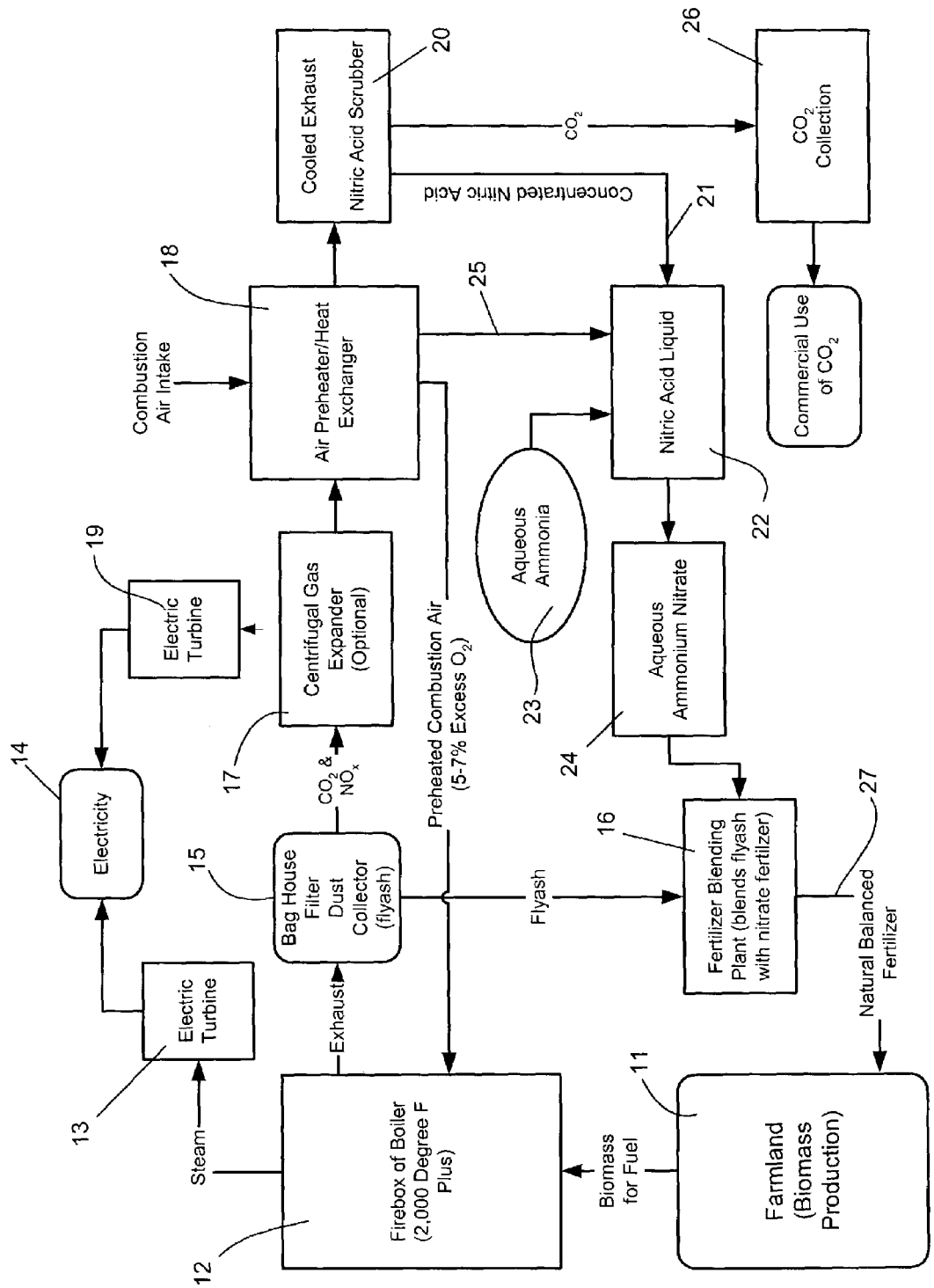
FIG. 1 is a schematic flow chart of the process and system according to the present invention for generating power, producing fertilizer and sequestering carbon dioxide using renewable biomass.

In FIG. 1, closed-loop process is shown where grain is produced on farmland 11 and then delivered to the power plant. Electric energy is then produced by burning the grain. Specifically, the grain is conveyed in a controlled manner to an inlet of the firebox 12 of a cyclonic or opposing wall fired burner system. These are the preferred boiler designs due to the high levels of turbulence encountered in the burning area which enhance the production of $NO_x$ by 85% to 900% over low temperature fluidized bed systems and tangentially fired systems. Approximately 90% of the $NO_x$ of the flue gas exhausted from the firebox 12 is NO (nitrogen oxide), and the remaining 10% is $NO_2$. Flame temperature, equivalence ratio, and air and fuel preheat temperatures all affect $NO_x$ production.

The grain or other biomass is blasted into the firebox 12 and burned as fuel for the plant. The firebox 12 is preferably maintained at a temperature exceeding about 2,000° F. by the burning grain and provides the primary steam source to power a turbine 13 to create electricity 14.

To this fuel stream is added preheated excess air flows to provide 5 to 7% excess oxygen (25–45% excess air). At these excess $O_2$ levels, the $NO_x$ production will double over the normal levels of most existing boilers.

The desired temperature of the oxidation area is the highest that the particular boiler design can withstand under normal safety limits. The temperature used today in most situations is approximately 1,600° F. If the temperature is raised to 2,000° F., $NO_x$ production will increase by 60%. If the temperature is further raised to 2,400° F., $NO_x$ production will increase by another 60%. A further increase from 2,400° F. to 2,800° F. will triple $NO_x$ production. Any temperature over 2,800° F. will increase production of $NO_x$ exponentially. Therefore, a preferred system according to the present invention will operate at a temperature exceeding about 2,800° F.

The flue gases are maintained in the high temperature environment of the firebox 12 of the boiler as long as possible to enhance the production of $NO_x$. The increased residence time, which is the time the incoming air is held in the firebox 12 of the boiler at these high temperatures, can increase $NO_x$ production by 2 to 3 times. For example, if a conventional boiler in a fossil fuel plant has a residence time of one second, the boiler used in the present invention may have a residence time of 2 to 5 seconds.

The higher operating temperature within the boiler in the present system will increase $NO_x$ production in the range of sixfold over conventional boiler systems. The higher operating temperature will also increase the efficiency of the boiler by producing more working steam per Btu of fuel than is possible with fossil fuel fired systems operating at low temperatures. The working steam will come off the superheater headers as in normal operations.

Once the flue gases have passed through the economizer section and the reheat tube assemblies, it will pass through a bag house 15 that filters and collects the mineral content or flyash of the incinerated grain. This will amount to no more than 1.5% of the volume of the grain fuel. This is collected and delivered to a fertilizer blending plant 16 to be added back to the fertilizer blend as prescribed by the soil agronomist.

The filtered gases then pass through an optional centrifugal separator 17 that splits the NO (nitrogen oxide) from the $CO_2$ and any water vapor ($H_2O$) that may still be present along with minor amounts of $NO_2$, $SO_2$, and other possibly volatilized trace minerals. The energy released from the centrifugal separator can be utilized in a refrigerant working fluid system to power a second turbine 19 to create electricity. An example of such a system is described in U.S. Pat. No. 5,146,755.

The separated NO and $CO_2$ streams then pass through two separate heat exchangers 18 to further cool the gases and to preheat the intake of combustion air for the firebox 12 of the boiler. As explained above, the preheated combustion air provides approximately 25 to 45% excess air flow to the firebox 12, thereby resulting in 5 to 7% more oxygen than necessary for combustion of the biomass. The preheated excess air flow to the firebox 12 increases the $NO_x$ production.

Once the NO gas mixture reaches a temperature of about 70° F., the water vapor condenses. At this point, the $NO_x$ must be captured from the flue gas stream. This can be accomplished by using a suitable nitric acid scrubber 20, which can be in the form of multiple reaction chambers followed by wash chambers. When $NO_2$ contacts $H_2O$, it reacts to form nitric acid. Ten percent of the remaining NO then reacts with oxygen in the air to form more $NO_2$. Theoretically, this reaction never reaches zero nitrogen oxide (NO) because only 10% reacts each time. However, the use of multiple reaction chambers and wash chambers and the recycling of the $NO_x$ through the chambers will improve the $NO_x$ capture.

Alternatively, the $NO_x$ capture and production of nitric acid from the $NO_x$ can be accomplished in a more efficient manner by using a nitric acid scrubber 20 that passes the flue gas through a tower of nitric acid and excess reacted trivalent nitric oxides ($N_2O_3$) in aqueous (liquid) form. This method of $NO_x$ capture will use the technology developed recently by Drinkard, Jr. (U.S. Pat. No. 6,264,909). The Drinkard, Jr. process involves reacting NO from a source of $NO_x$ with $HNO_3$ in the presence of $N_2$ to produce nitric trioxide ($N_2O_3$) and water, and then reacting the nitric trioxide with oxygen and water to produce nitric acid. The $NO_2$ gas from the $NO_x$ is converted to nitric acid and NO by reacting with water, and the remaining NO product is then converted to nitric acid as described above. According to Drinkard, Jr., the nitric trioxide can be produced rapidly in high concentrations and will react quickly to form nitric acid. The reactions will proceed in the liquid phase, presumably in a water column, atomizer or the like, and high pressure and temperature are not required.

Once the concentrated nitric acid 21 is produced from the captured $NO_x$ by the process described above, the nitric acid can be collected in a holding tank 22 and used to produce a nitrogen-based fertilizer in a known manner. For example, one of several high nitrogen fertilizer bases can be produced by reacting the concentrated nitric acid with aqueous ammonia 23 to produce ammonium nitrate 24, limestone (calcium carbonate) to produce calcium nitrate, or several other known compounds common to the fertilizer industry. The $CO_2$, $H_2O$, $NO_2$, stream with the final cooling will have the water vapor condense and wash out the remaining $NO_2$ as a weak nitric acid 25 that can be blended in with the concentrated nitric acid 21 to maintain a concentration level sufficient to produce the fertilizer products.

The $CO_2$ can be collected in a holding container 26 and sold as a commercial product in its own market, and a small portion of it can be used to aerate the onsite grain storage structures to act as an insecticide and control vermin.

The nitrogen-based fertilizer product 24 is transferred to the fertilizer blending plant 16 that adds back the micro nutrients that were collected as flyash in the bag house 15. The resulting fertilizer product 27 will have approximately the same fertilizer and mineral content as was removed from the farmland 11 by the grain harvest. This will return to the soil the same nutrients that were removed in the grain fuel and that will be needed to sustain continuous crop production. As the next crop grows in the field it will take in vast amounts of $CO_2$ and incorporate the carbon into the plant and roots to be eventually returned to the soil.

Figure 2:
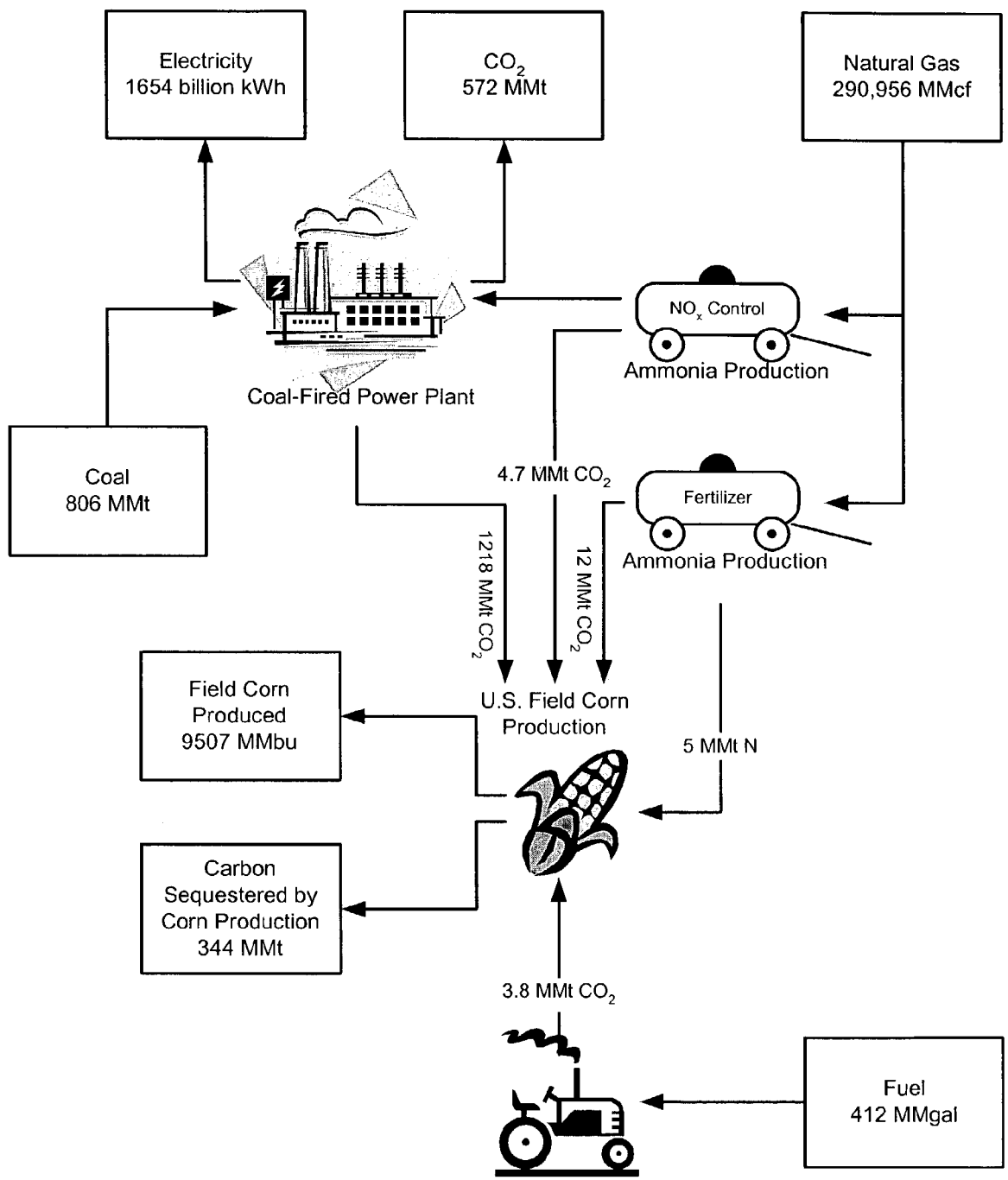
FIG. 2 is a schematic diagram of the current domestic corn-based agriculture, ammonia production, and coal-fired power plants showing the key product transfers between industries.
Figure 3:
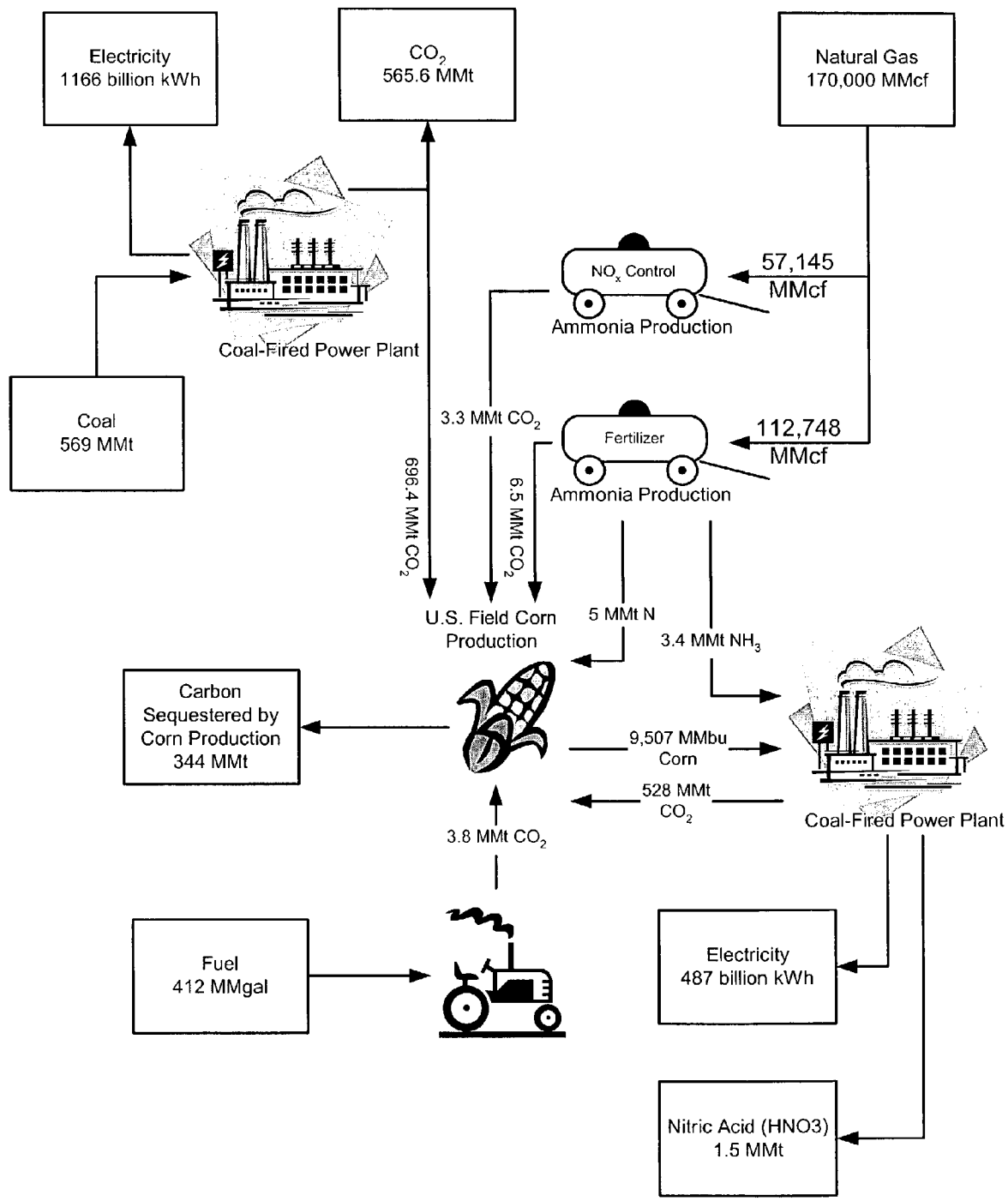
FIG. 3 is a schematic diagram of how a corn-based power facility using the present invention could alter the $CO_2$ cycle and energy requirements as compared to the current scenario shown in FIG. 2.

The potential impact of the present invention on the affected industries will be explained by a comparison of FIGS. 2 and 3. FIG. 2 is a schematic diagram of the current domestic corn-based agriculture, ammonia production, and power generation using coal-fired power plants. FIG. 3 is a schematic diagram of how a corn-based power facility using the present invention could alter the $CO_2$ cycle and energy requirements as compared to the scenario shown in FIG. 2.

The farmer in both FIGS. 1 and 2 consumes fuel to produce corn. Fuel consumption and $CO_2$ production on the farm are the same for both scenarios. Fuel consumption of six gallons per acre was assumed based on known averages. $CO_2$ production was calculated based on the consumption of gasoline. Grain production of 9506 million bushels was based on the USDA figures for total U.S. production in 2001. Nitrogen requirements of 150 lb/acre were assumed based on known averages.

FIG. 2 assumes all coal-fired utility electrical generation totaling 1654 billion kWh. Coal is assumed to generate 10,000 Btu/lb and to be available at a purchase price of $1.20/MMBtu. Ammonia use is based on all power plants controlling unabated $NO_x$ emissions of 1.25 lb/MMBtu firing rate and achieving reduction of 75% using selective catalytic reduction. The ammonia requirement based on this performance is 0.3 lb. $NH_3$/MMBtu firing rate.

In FIG. 3, an industrial facility for producing fertilizer, ammonia, and electricity is shown which is fueled with the total U.S. domestic production of corn. The scenario shown in FIG. 3 results in a 30% reduction in the amount of coal consumed annually to meet electricity demands in the United States. Nitrogen is derived from the flue gas, as explained above in connection with the process shown in FIG. 1. Natural gas is consumed to produce ammonia for the production of ammonium nitrate at the power plant. The key process production assumptions for FIG. 3 are as follows:

Electrical generation efficiency 35%

Higher heating value (HHV) corn 8928 Btu/lb

Excess air 20%

2,000 ppm $NO_x$ production

Power plant $CO_2$ production 222 lb $CO_2$/MMBtu fuel

Net nitric acid production 5.36 lb/MMBtu corn

Nitrogen production 0.46 lb $N/HNO_3$ produced

Ammonia to make ammonium nitrate 0.3 lb $NH_3$/lb $HNO_3$ produced

Natural gas consumption to make ammonia 33.5 MMBtu/ton $NH_3$ $CO_2$ production calculated from the Haber Process The requirements for ammonia as fertilizer in the existing scenario shown in FIG. 2 will decrease in the scenario shown in FIG. 3. Ammonium nitrate will be produced from $NO_x$ generated by combustion of corn in a power plant, as explained above with reference to FIG. 1. As a result, natural gas required to produce ammonia using the well-known Haber Process will be decreased by 42% in the scenario shown in FIG. 3 as compared to the scenario shown in FIG. 2. This reduction will account for a substantial decrease in $CO_2$ emissions to the atmosphere.

FIG. 3 illustrates the macroscopic economics and environmental impacts of a widespread adoption of the present invention in the United States. On a smaller scale, it will be seen that promising economics can also be achieved for small industrial power plants using the teachings of the present invention. For example, an electric power plant of approximately 500 kW can be fueled from approximately 640 acres of either corn or switchgrass. The following Table 1 is presented to show the feasibility of an industrial facility fueled with either corn or switchgrass.

TABLE 1

Economics for Corn and Switchgrass Production for a 500-kW Power Plant

| | Corn | | Switchgrass | |
|---|---|---|---|---|
| Harvested Acres | 640 | acres | 640 | acres |
| Production | 88,448 | bu | 2560 | tons |
| Fuel Value | 44,221 | MMBtu | 40,960 | MMBtu |
| Electricity Production | 4,534,840 | kWh | 4,200,410 | kWh |
| Capacity | 518 | kW | 479 | kW |
| $NO_x$ Production | 69 | tons | 63 | tons |
| Nitric Acid | 119 | tons | 110 | tons |
| Nitrogen Production | 54.5 | tons | 50.5 | tons |
| Ammonia Use | 35.6 | tons | 32.9 | tons |
| Revenues | | | | |
| Electricity ($0.066/kWh) | $299,299 | | $277,227 | |
| Nitrogen ($272/ton) | $14,828 | | $13,735 | |
| Purchases | | | | |
| Fuel ($5.00) | $221,106 | | $81,920 | |
| Ammonia ($224/ton) | $7,964 | | $7,377 | |
| Net Revenue | $85,058 | | $201,665 | |
| Capital Investment ($2,000/kW) | $1,035,352 | | $958,998 | |
| ROI | 12.2 | years | 4.8 | years |

In the above Table 1, it is assumed that power efficiency of the electric power plant using the higher temperatures taught by the present invention will be 35% greater than in conventional fossil fuel-based power plants. By assuming $NO_x$ production at 2,000 ppm, a return on investment of 5 to 12 years is shown. Switchgrass is shown as having even better returns than corn because of low fuel prices. Fuel cost and electricity value are the primary economic factors. However, if $NO_x$ levels can approach 50,000 ppm, then fertilizer production becomes the most significant economic factor. $NO_x$ levels of at least 8,000 ppm are possible, as taught by *The John Zink Combustion Handbook* (CRC, 2001), which would produce nitrogen revenues at approximately 10% of electricity revenues.

It is estimated that a coal power plant produces 1950 lbs. of $CO_2$/MWe of electricity produced. It would require approximately 30 bushels of corn (approximately ¼ acre) to produce 1 MWe based on present fossil fuel burning efficiencies. This amount of corn would remove approximately 8216 lbs. of $CO_2$ from the atmosphere, less approximately 2,016 lbs. attributed to the burning of the grain. The present invention would thus provide a net removal of about 6200 lbs. of $CO_2$ from the atmosphere per MWe of electricity generated. A 50MWe grain fueled power plant according to the present invention would allow for the net remediation of 1,314,000 tons of $CO_2$ from the atmosphere on an annual basis. 150 such plants, which is approximately what would be required to burn the present excess grain production capabilities in the United States, would sequester 197,100,000 tons of $CO_2$ annually.

The present invention will also reduce the demand for burning natural gas to produce anhydrous ammonia. For example, the conventional Haber Process requires 25,000,000 Btu to produce one ton of anhydrous ammonia. This is approximately $75.00 worth of natural gas at $3.00 per million Btu, a cost which will be saved with the present invention. The present invention will produce sufficient levels of $NO_x$ at maximum operation to provide more than enough nitrogen to regrow the subsequent crop.

The present invention provides an organic, renewable process for generating electricity which eliminates pollutants, such as cadmium, arsenic, lead, and an array of heavy metals common to the fossil fuel process.

The present invention will result in a net decrease of $CO_2$ in the atmosphere due to the amount of carbon sequestered by the annual growth of a corn, milo, wheat, or other annual plant used in comparison to the amount of $CO_2$ given off in the oxidation of the grain fuel it produces. This is further enhanced by the practice of no-till farming, which minimizes soil disturbance thereby reducing the escape of $CO_2$ from the soil.

Adherence to the agronomic processes (no-till and balanced fertilizer application) will improve the farm ground used for production of the fuel used by the applicant's system.

The value of commodity grains in rural areas will increase due to increased usage of grain, reduced costs to transport the grain, and reduced cost to transport the final end product, electricity. The electricity generated can be sold and delivered through existing power grids. Furthermore the fertilizer is produced in the vicinity of the fields and does not incur significant transportation costs.

Development and implementation of the present invention will comply with and compliment current efforts being made by state and federal governments for rural development. The invention will provide employment in the construction phase, future ongoing operations, and attraction of businesses dependent upon reliable, clean, environmentally responsible electrical energy.

While the invention has been specifically described in connection with specific embodiments thereof, it is to be understood that this is by way of illustration and not of limitation, and the scope of the appended claims should be construed as broadly as the prior art will permit.

What is claimed is:

1. A process for generating electricity and producing fertilizer, comprising the steps of:
   incinerating a biomass material to create electricity;
   capturing $NO_x$ from exhaust gases produced by incinerating the biomass material; and
   using the $NO_x$ to produce a nitrogen-based fertilizer;
   wherein said step of capturing $NO_x$ from the exhaust gases comprises bubbling the gases through an aqueous solution of nitric acid and excess reacted trivalent nitric oxides to produce nitric acid.

2. A process for generating electricity and producing fertilizer, comprising the steps of:
   incinerating a biomass material to create electricity;
   capturing $NO_x$ from exhaust gases produced by incinerating the biomass material; and
   using the $NO_x$ to produce a nitrogen-based fertilizer;
   wherein said step of capturing $NO_x$ from the exhaust gases comprises exposing the gases to a solution of nitric acid and excess reacted trivalent nitric oxides to produce additional nitric acid.

3. The process according to claim 2, further comprising the step of blending the nitric acid with a fertilizer base to produce said nitrogen-based fertilizer.

4. The process according to claim 2, wherein said biomass material is a grain selected from the group consisting of corn, wheat, milo and soybeans.

5. The process according to claim 2, wherein said step of incinerating a biomass material comprises incinerating a biomass material in a firebox using a burner system having a high level of turbulence to enhance the production of $NO_x$.

6. The process according to claim 5, wherein said burner system is a cyclonic or opposing wall fired burner system.

7. The process according to claim 2, wherein said biomass material is incinerated in a firebox of a boiler to generate steam for powering a first turbine to create electricity, and further comprising the step of introducing excess oxygen into the firebox to increase $NO_x$ production.

8. The process according to claim 7, wherein said step of introducing excess oxygen comprises introducing 5 to 7% more oxygen in the firebox than needed for complete combustion of the biomass material.

9. The process according to claim 7, further comprising the step of maintaining the flue gases in a high temperature environment of the boiler for a sufficient residence time to substantially increase $NO_x$ production in the boiler.

10. The process according to claim 7, further comprising the step of operating an oxidation area of the boiler at a temperature exceeding about 2,000° F.

11. The process according to claim 10, further comprising the step of operating the oxidation area of the boiler at a temperature exceeding about 2,800° F.

12. The process according to claim 7, further comprising the step of passing flue gases exhausted from the boiler through a heat exchanger to further cool the gases and power a second turbine to create electricity.

13. The process according to claim 12, further comprising the step of using the heat exchanger to preheat an excess air flow introduced into the boiler which provides said excess oxygen.

14. The process according to claim 7, further comprising the step of passing flue gases exhausted from the boiler through a separator to split a nitrogen oxide component of the gas mixture from a carbon dioxide component thereof.

15. The process according to claim 13, further comprising the step of collecting the separated carbon dioxide component for commercial use.

16. A process for generating electricity and producing fertilizer, comprising the steps of:
   incinerating a biomass material to create electricity;
   capturing $NO_x$ from exhaust gases produced by incinerating the biomass material; and
   using the $NO_x$ to produce a nitrogen-based fertilizer;
   further comprising the step of collecting flyash of the incinerated biomass and blending the flyash with the nitrogen-based fertilizer to form a balanced fertilizer product that allows sustainable production of the biomass material as a fuel source.

17. A process for generating electricity and producing fertilizer, comprising the steps of:
   incinerating a biomass material in a firebox of a boiler with the oxidation area of the boiler operating at a temperature exceeding 2,000° F. to create electricity;
   introducing an excess air flow into the firebox to provide 5 to 7% more oxygen in the firebox than needed for complete combustion of the biomass material to increase $NO_x$ production;
   collecting flyash from the incinerated biomass;
   removing $NO_x$ from flue gases exhausted from the boiler by passing the flue gases through an aqueous solution of nitric acid and excess reacted trivalent nitric oxides to produce additional nitric acid; and
   using the additional nitric acid produced from the $NO_x$ together with the collected flyash to make a nitrogen-based fertilizer.

18. The process according to claim 17, further comprising the steps of:
   passing the exhausted flue gases through a heat exchanger to cool the gases and power a second turbine to create electricity; and
   using the heat exchanger to preheat the excess air flow before it is introduced into the boiler.

19. The process according to claim 17, further comprising the step of operating the oxidation area of the boiler at a temperature exceeding about 2,800° F.

20. A system for generating electricity and producing fertilizer, comprising:
   means for incinerating a biomass material in boiler operating at a temperature exceeding 2,000° F. to create electricity;
   means for introducing an excess air flow into the boiler to provide 5 to 7% more oxygen than needed for complete combustion of the biomass material to increase $NO_x$ production;
   means for collecting flyash of the incinerated biomass from the boiler;
   means for removing $NO_x$ from the exhausted flue gases by passing the gases through aqueous solution of nitric acid and excess reacted trivalent nitric oxides to produce additional nitric acid; and
   means for combining the additional nitric acid produced from the $NO_x$ together with the collected flyash to make a nitrogen-based fertilizer.

* * * * *